Nov. 13, 1962     E. J. PETRICK     3,063,495
ROLLER LOCK ASSEMBLY FOR A PICTURE SCREEN
Filed Feb. 27, 1958     2 Sheets-Sheet 1
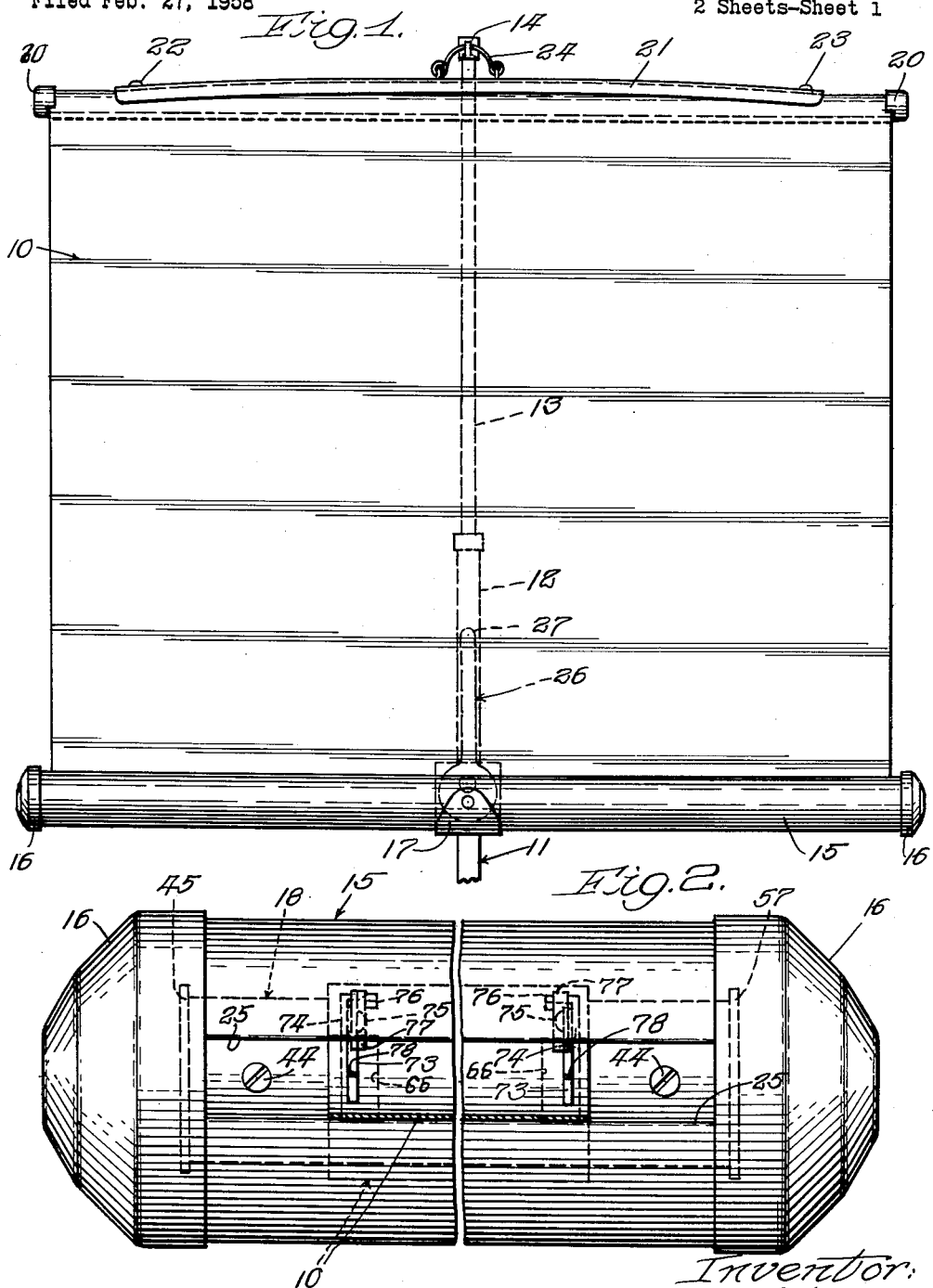

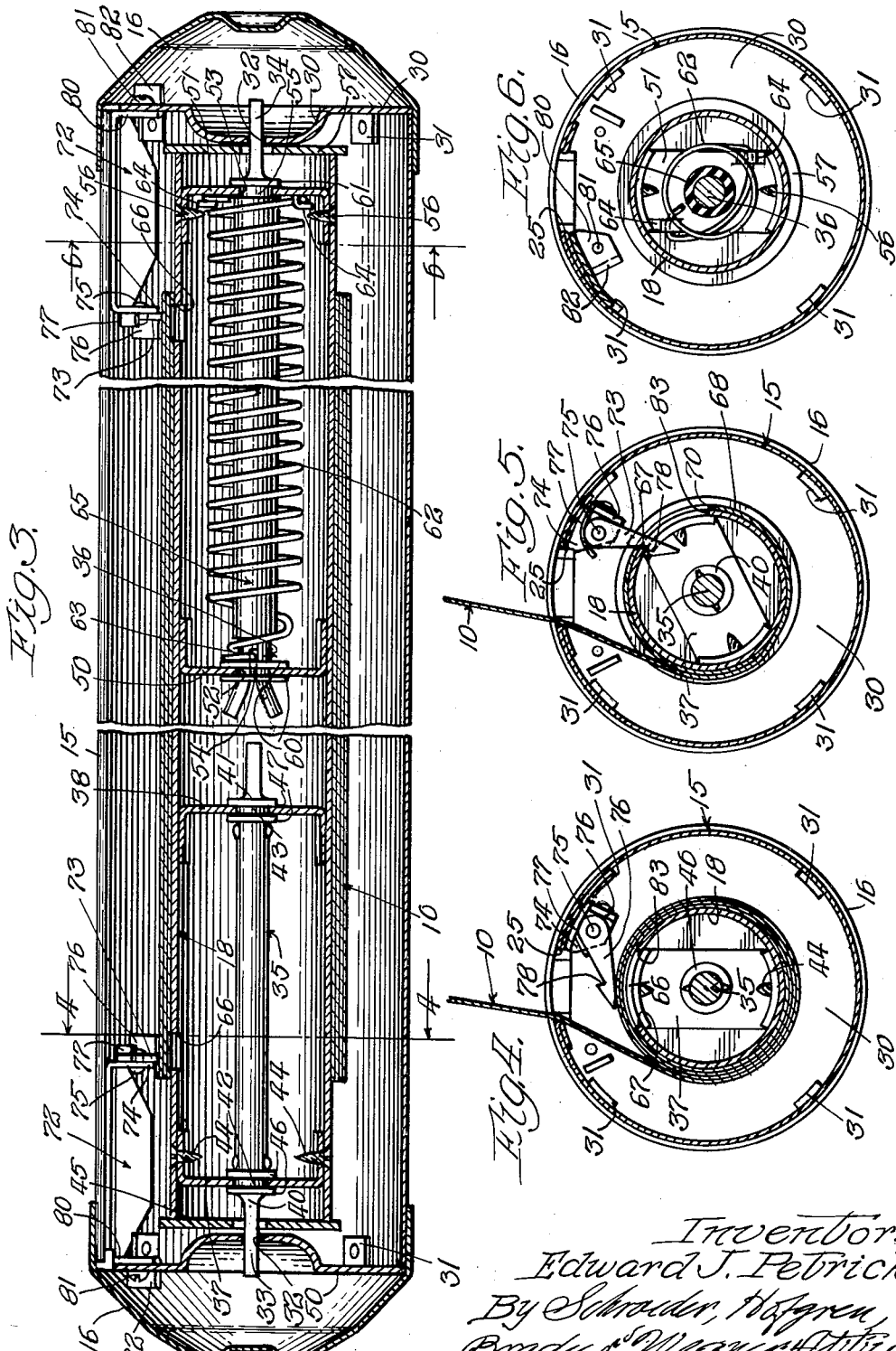

United States Patent Office 3,063,495
Patented Nov. 13, 1962

3,063,495
ROLLER LOCK ASSEMBLY FOR A PICTURE SCREEN
Edward J. Petrick, Park Ridge, Ill., assignor to Bretford Manufacturing, Inc., Franklin Park, Ill., a corporation of Illinois
Filed Feb. 27, 1958, Ser. No. 718,081
7 Claims. (Cl. 160—24)

This invention relates to a portable picture screen assembly, and more particularly to a roller-lock for holding the reel against rotation when the screen is in exposed operative position.

Picture screen assemblies are commonly provided with a spring actuated reel of the shade-roller type to which an edge of the flexible screen web or picture screen is secured. When the assembly is not in use, the picture screen is wound upon the reel for convenience in storing. The flexible picture screen, usually made of cloth, has a light reflective surface and has commonly been attached to the reel by lapping a marginal edge portion about the reel and securing the edge portion to the screen by a line of stitching or metal staples. When the screen was wound upon the reel for a long period of time, the double thickness of screen near the reel frequently caused the formation of spaced indentations or lines on the viewing surface. Screen tensioning devices have been partially successful in eliminating these indentations or lines.

The indentations on the viewing surface of the screen can be minimized if the line of stitching is eliminated and the screen edge is attached directly to the reel by an adhesive. If the reel is left free to rotate, any pull on the screen in fully exposed position is exerted against the line of adherence between the screen edge and reel so that the screen edge will ultimately be stripped from the reel. However, the screen edge and reel attachment can be maintained secure by locking the reel against rotation when the screen is in fully exposed position so that any force on the screen is sustained by an area of contact between the marginal edge portion of the screen and the reel.

In the earlier Patent No. 2,822,040 of Ed Petrick et al., issued February 4, 1958, a device was shown for locking the roller against rotation. The present invention is another form of roller-lock which is adapted to hold the roller against further rotation when the screen is unwound to fully exposed operative position. With the present struture, an end of the picture screen may be adhered to the reel so that the problem of the lines of indentation on the screen surface will be minimized. In addition, the manufacturing step of attaching the screen web to the reel is simplified and expedited. Experience has also shown that the picture screens can be attached more accurately which results in less screen rejects and in accompanying savings in costs of picture screen material.

The primary object of the present invention is to provide a new and improved roller-lock assembly for a portable picture screen.

Another object is to form a picture screen assembly which substantially eliminates the problem of indentations on the viewing surface of the screen web.

A further object is to provide a roller-lock assembly for a picture screen having cooperating catch portions which are automatically engageable when the picture screen is in fully exposed position to hold the reel against further rotation.

Still another object is to provide a roller-lock assembly for a picture screen having a catch portion mounted on the screen casing and normally urged against the surface of the picture screen except when the screen is in exposed operative position, the catch portion being automatically movable through a cut-out portion of the picture screen when the screen is in exposed operative position to cooperatively engage a second catch portion on the reel and hold the reel against further rotation.

The invention is illustrated in a preferred embodiment in the accompanying drawings, in which:

FIG. 1 is a fragmentary elevational view of a picture screen assembly showing the picture screen suspended in exposed operative position;

FIG. 2 an enlarged fragmentary top plan view of the picture screen casing of FIG. 1 showing partly in dotted outline the relative positions of each of the pairs of co-operating catch portions adjacent the opposite ends of the screen reel;

FIG. 3 an enlarged fragmentary sectional view of the casing shown in FIG. 2 showing the picture screen wound upon the reel;

FIG. 4 a sectional view taken as indicated on line 4—4 of FIG. 3;

FIG. 5 a sectional view similar to FIG. 4 showing the picture screen being unwound from the reel and a catch portion or dog projected into holding engagement with the trailing edge of an opening in the tubular reel; and FIG. 6 a sectional view taken as indicated on line 6—6 of FIG. 3.

In the embodiment illustrated, and referring particularly to FIGURE 1, a flexible screen web or picture screen, generally designated 10, is shown suspended in exposed operative position from a supporting standard, generally designated 11. The lower part of the standard is broken away, but a foldable type of tripod standard is preferably used to support the picture screen assembly. As herein shown, the standard 11 includes a main tubular section 12 into which a rod member 13 may be telescoped. The free end of the rod member 13 is provided with a bail support 14 from which the picture screen 10 may be suspended, and rod member 13 is preferably made adjustable as to height by a manual clamp (not shown) at the upper end of the tubular section 12.

A screen casing, generally designated 15, having decorative caps 16 at its opposite end portions may be pivotally secured to the tubular section 12 of the standard 11 by a mounting cradle 17, preferably formed of metal. As will be explained more fully later, the screen casing 15 houses and rotatably supports a screen reel, generally designated 18, to which an end of the screen 10 is secured. The reel 18 is spring-actuated and normally tends to rotate so as to wind up the screen 10 upon the reel in closed inoperative position.

The free end of the screen 10 is preferably provided with a transversely extending slat 20 to which a resilient elongated channel member 21 is secured at spaced points 22 and 23. The channel member 21 is preferably nickel or chrome plated for decorative purposes, and carries a bail member 24 in its medial portion. To extend the screen 10 into exposed operative position, the screen is pulled outwardly through a longitudinal slot 25 in the casing 15, and the bail member 24 is hooked over the bail support 14.

A tensioning means 26 is indicated in dotted outline in FIGURE 1. The means 26 is preferably of the type shown in U.S. Patent No. 2,793,687 of Edward J. Petrick, issued May 28, 1957, and reference is made to that patent for a more complete description of the screen tensioning device. It is sufficient for purposes of the present invention to merely set forth the functioning of means 26. That is, when the pivoted hand lever 27 is swung downwardly through 180°, the casing 15 and the reel 18 are carried downwardly in relation to the bail support 14 so that the channel member 21 is flexed and exerts reactive forces upwardly in the opposite longitudinal marginal edge portions of the screen 10 to pull the screen 10 uniformly taut over its entire surface.

As best shown in FIGS. 3 and 4, the opposite ends of the casing 15 are each provided with a closure plate 30 beneath the decorative cap 16. The closure plates 30 are generally round as shown in FIG. 4 and are provided with a number of inwardly projecting guide lugs 31 which assist in centering the closure plates upon the ends of the casing. The center of each plate 30 is apertured as at 32 to snugly receive flattened end 33 and 34 of reel supports, generally indicated 35 and 36 respectively. By making the apertures 32 of the closure plates 30 closely conform to each of the flattened ends 33 and 34, the reel supports 35 and 36 are held against rotation with respect to the rotatable reel 18.

As best shown in FIGS. 3 through 6, the reel 18 is preferably tubular and formed from metal in the shape of a right circular cylinder. The reel support 35 is maintained in axial disposition with respect to the reel 18 by a pair of U-shaped bearings 37 and 38 spaced longitudinally of one end of the reel 18. Each of the bearings has central apertures, as at 40 and 41, to journal an end of the reel upon the spaced bearing surfaces 42 and 43 of the reel support 35. One or both of the U-shaped bearings 37 and 38 may be secured to the reel. As herein shown, only the bearing 37 is so secured by the cap screws 44.

To avoid metal-to-metal contact between an end reel 18 and a closure plate 30, a relatively stiff fiber washer 45 may be provided as shown at the left of FIG. 3. Fiber guide washers may also be provided about the reel support 35 and on opposite sides of each of the U-shaped bearings 37 and 38 as shown at 46 and 47.

The reel support 36 is generally supported in a manner similar to that described with respect to reel support 35. That is, U-shaped bearings 50 and 51 are centrally apertured at 52 and 53 to make a close fit with longitudinally spaced bearing surfaces 54 and 55 of the reel support 36. Again, one of the U-shaped bearings, herein bearing 51, is secured to the rotatable reel 18 by cap screws 56. A relatively stiff fiber washer 57 fits about the flattened end 34 of the reel support 36 to prevent metal-to-metal contact between the reel 18 and the closure plate 30. Also, fiber guide washers 60 and 61 are provided about the reel support 36 on opposite sides of the U-shaped bearings 50 and 51 to maintain the relative positions of the U-shaped bearings and the reel support 36.

Thus, when the reel 18 is rotated, the reel supports 35 and 36 extending axially of the reel 18, are held against rotation by the flattened ends 33 and 34 bearing against the closure plates 30. The reel 18 then is actually journaled for rotation by the U-shaped bearings 37, 38, 50 and 51 rotating upon the spaced bearing surfaces 42, 43, 54 and 55.

As previously mentioned, the reel 18 is normally spring urged in a direction so as to wind the picture screen 10 upon the lateral surface of the reel 18. As herein shown in FIGURE 3, a relatively heavy coiled torsion spring 62 embraces the length of the reel support 36. One end of the coil spring 62 is secured within a slot 63 of the non-rotatable reel support 36, and this split end of the reel support 36 is bent in the manner of a cotter pin to hold the fiber washers 60 and the U-shaped bearing 37 in place. The other end of the coil spring 62 is secured about a pair of lugs 64 struck inwardly from the U-shaped bearing 38. A rubber or plastic sleeve 65 may be provided within the coil spring 62 and about the reel support 36 to minimize metal-to-metal contact. Thus, when the screen 10 is pulled outwardly of the screen casing 15, the reel 18 and the U-shaped bearing 38 are rotated so as to impart a torsional stress to the coil spring 62. This spring torsion is sufficient to cause a rotation of the reel 18 and rewind the screen 10 about the lateral surface of the reel when it is desired to move the screen to closed, inoperative position within the casing 15.

As best seen in FIGS. 3 through 5, the lateral surface of the tubular reel 18 is provided with a transversely extending slot 66 near each of its opposite ends. When the screen 10 is being unwound from the reel, a trailing edge 67 of the slot 66 forms one of a pair of cooperating catch portions about which more will be said later.

The screen 10 is provided with a lower transverse marginal edge portion 68 which is smoothly and accurately secured to the reel 18 preferably by a conventional adhesive. The screen edge portion 68 is then preferably wound once or twice about the reel 18, and a part of the marginal edge portion 68 is removed as at 70 to expose the slot 66 in the reel 18. When the screen 10 is completely wound on the reel 18, a longitudinally extending portion 71 of the screen 10 covers the slot 66 in the reel so that no member can be projected therein.

In the present structure, automatic locking of the reel 18 against rotation when the screen 10 is in fully exposed operative position (FIG. 1) is accomplished by providing a second cooperating catch portion normally urged toward the reel surface and in position to project into and engage the trailing edge 67 of the reel slot 66. To this end, a bracket, generally designated 72, is secured to the inner surface of the screen casing 15 by a number of cap screws, not shown. As best shown in FIGS. 3 through 5, a second catch portion or dog 73 is pivotally supported on an integral downturned bracket shoulder 74 by a pin 75. The shoulder 74 has an inwardly extending lug 76 which acts to limit the counterclockwise pivoting of the dog 73 (see FIG. 5). The lug 76 also carries a leaf spring 77 which bears against the dog 73 and normally urges the dog in a counterclockwise direction as shown in FIG. 4. The free end of the pivoted dog is preferably provided with a hook member 78 arranged to cooperatively engage the trailing edge 67 of the reel slot 66 to hold the reel 18 against further rotation in a clockwise direction as shown in FIG. 5.

The outer end of the bracket 72 is also provided with an apertured integral shoulder 80 which receives a bolt and its nut as at 81 to firmly secure the closure plate 30 on the end of the casing 15. A projection 82 formed integrally with the shoulder 80 is also provided and extends outwardly through an opening in the closure plate 30 to further strengthen the mounting of the bracket 72.

Although only one bracket 72 and its dog 73 has been described as shown in FIG. 3, similar structures are shown mounted on each end of the casing 15. The brackets and dogs are accurately positioned so that the dog 73 will simultaneously enter and engage the trailing edges 67 of the slots 66 in the reel.

The operation of the present device can best be understood by referring to FIGS. 3, 4 and 5. As the screen 10 is pulled outwardly of the casing 15 through the casing slot 25 toward fully exposed operative position shown in FIG. 1, the smooth side of the dog 73 initially bears against and rides on the longitudinally extending portion 71 of the screen 10. However, just as the screen 10 reaches fully exposed position, the dog 73 rides off of the interposed screen portion and is projected inwardly into reel slot 66 where the hook member 78 of the dog engages about the trailing edge 67 of the slot 66 to prevent further rotation of the reel 18. Having thus anchored the reel against rotation, the tensioning means 26 may be actuated to pull the screen taut and the screen marginal edge portion 68 will remain securely attached to the lateral surface of the reel 18.

When it is desired to move the screen 10 to closed inoperative position, the tension on the screen is first released by turning the hand lever 27 of the tensioning means 26. From FIG. 5 it can be seen that the reel 18 is automatically released from its engagement with the dogs 73. This is accomplished by the counterclockwise rotation of the reel 18 whereby the forward edge 83 of the reel slot 66 strikes the dig and pivots it upwardly out of the slot 66 against the action of the leaf spring 77. The dog 73 then continues to ride upon the surface of the screen 10 as the screen 10 is being rewound upon the reel 18.

The foregoing detailed description is given for clearness of understanding only and no unnecessary limitations should be understood therefrom for some modifications will be obvious to those skilled in the art.

I claim:

1. A roller-lock assembly for a picture screen, comprising: an elongated stationary support; a spring-actuated rotatable reel for a picture screen journaled in said support, said reel having an opening in its lateral surface to provide a first catch portion; a flexible screen having a transverse marginal edge portion attached to said rotatable reel, the screen being wound upon the reel when in closed position and being adapted for unwinding from the reel to exposed operative position, said screen having a slotted portion adjacent the transverse marginal edge portion and in alinement with said first catch portion to expose the first catch portion when the screen is unwound to exposed operative position; and a second catch portion mounted on the stationary support adjacent said first catch portion and being spring-urged toward the first catch portion, said second catch portion normally bearing against the screen wound upon the reel, and being adapted to move through the slotted portion of the flexible screen into engagement with the first catch portion to hold the reel against rotation when the screen is unwound to exposed operative position.

2. A roller-lock assembly for a picture screen as specified in claim 1, in which the reel is tubular and the first catch portion is the trailing edge of the opening as the reel is being unwound.

3. A roller-lock assembly for a picture screen as specified in claim 1, in which the reel is tubular so that the trailing edge of the opening as the reel is unwound provides the first catch portion, and the second catch portion comprises a pivoted dog spring urged toward the first catch portion and provided with a terminal hook, said pivoted dog normally bearing against the screen wound on the reel and being adapted to move through the slotted portion of the flexible screen to engage said terminal hook about said trailing edge of the opening to hold the reel against rotation when the screen is unwound to exposed operative position.

4. A roller-lock assembly for a picture screen as specified in claim 3, in which the opening in the reel is of such a size relative to the pivoted dog that the forward edge about said opening contacts and pivots the dog out of the opening when the screen is being rewound upon the reel.

5. A roller lock assembly for a picture screen, comprising: an elongated stationary support; a rotatable reel for a picture screen journaled in said support; catch portions on said reel and on said stationary support positioned for cooperative engagement to arrest rotation of said reel, one of said catch portions being normally urged toward the other to effect latching engagement; and a flexible picture screen secured at one end to said rotatable reel, said flexible picture screen being normally interposed between the catch portions when wound upon the reel in closed position and having a cut-out portion adjacent said one end and in alinement with the catch portions, so that when the screen is unwound to exposed operative position, the cut-out portion will expose the catch portions to each other for latching engagement to arrest rotation of the reel.

6. A roller lock assembly for a picture screen, comprising: an elongated stationary support; a rotatable reel for a picture screen journaled in said support; catch portions on said reel and on said stationary support positioned for cooperative engagement to arrest rotation of said reel, one of said catch portions being normally urged toward the other to effect latching engagement; and a flexible picture screen adhered at one end throughout a transverse marginal edge screen surface area to said rotatable reel, said flexible picture screen being normally interposed between the catch portions when wound upon the reel in closed position and having a cut-out portion adjacent the adhered screen surface area and in alinement with the catch portions so that when the screen is unwound to exposed operative position, the cut-out portion will expose the catch portions to each other for latching engagement to arrest rotation of the reel.

7. A roller lock assembly for a picture screen, comprising: an elongated screen casing; a spring-actuated rotatable reel journaled in said casing; catch portions on said reel and on said casing positioned for cooperative engagement to arrest rotation of said reel, one of said catch portions being normally urged toward the other to effect latching engagement; and a flexible picture screen secured at one end to said rotatable reel, said flexible picture screen being normally interposed between the catch portions and wound upon the reel in closed position and having a cut-out portion adjacent said one end and in alinement with the catch portions, so that when the screen is unwound to exposed operative position, the cut-out portion will expose the catch portions to each other for latching engagement to arrest rotation of the reel.

References Cited in the file of this patent

UNITED STATES PATENTS

| | | |
|---|---|---|
| 513,783 | Hartshorn | Jan. 30, 1894 |
| 2,099,068 | Keithly | Nov. 16, 1937 |
| 2,337,369 | Borchers | Dec. 21, 1943 |
| 2,703,687 | Petrick | May 28, 1957 |